Figure 1:
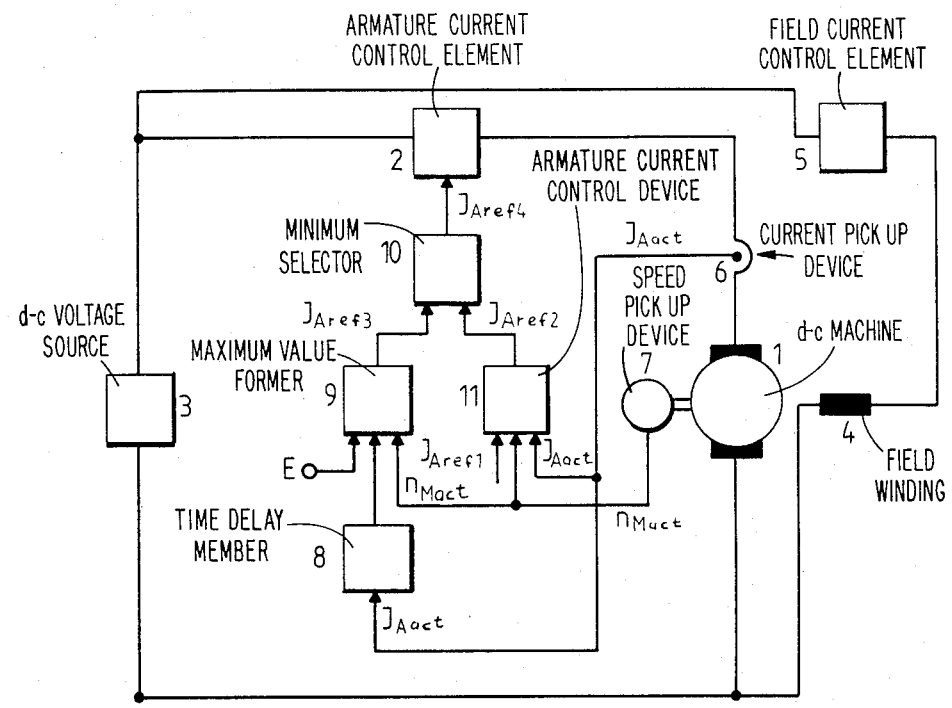

United States Patent [19]

Kahlen et al.

[11] Patent Number: 4,489,258

[45] Date of Patent: Dec. 18, 1984

[54] PROPULSION SYSTEM FOR VEHICLES WITH A D-C MACHINE

[75] Inventors: Hans Kahlen, Weinheim-Sulzbach; Jürgen Angelis, Mannheim, both of Fed. Rep. of Germany

[73] Assignee: Brown, Boveri & Cie, AG, Mannheim, Fed. Rep. of Germany

[21] Appl. No.: 463,551

[22] Filed: Feb. 3, 1983

[30] Foreign Application Priority Data

Feb. 4, 1982 [DE] Fed. Rep. of Germany ....... 3203682

[51] Int. Cl.$^3$ .............................................. G05B 5/00
[52] U.S. Cl. .................................... 318/317; 318/326; 318/327; 318/339; 318/346
[58] Field of Search ....................... 361/23, 30, 31, 33, 361/90; 318/310, 339, 346, 336, 312, 317, 345 C, 345 A, 345 B, 345 F, 345 G, 505, 494, 519, 434, 326, 327

[56] References Cited

U.S. PATENT DOCUMENTS 3,230,440  1/1966  Kleiner ............................ 361/90 X
4,305,025 12/1981  Arnold ............................... 318/327
4,375,609  3/1983  Wolf .................................... 318/312

Primary Examiner—Ulysses Weldon
Attorney, Agent, or Firm—Herbert L. Lerner; Laurence A. Greenberg

[57] ABSTRACT

A propulsion system for vehicles, includes a d-c machine, an armature current control element connected to the d-c machine, an alternating member having an output side connected to the armature control element and having an input side, an armature current control device connected between the input side of the alternating member and the d-c machine for delivering a first armature current reference value to the alternating member, a maximum value formed connected between the input side of the alternating member and the d-c machine for receiving the value of the actual machine speed and the actual armature current from the d-c machine and for delivering a second maximally permissible armature current reference value to the alternating member, the alternating member passing on the smaller of the first and second armature current reference value to the armature current control element.

5 Claims, 2 Drawing Figures

PROPULSION SYSTEM FOR VEHICLES WITH A D-C MACHINE

The invention relates to a propulsion system for vehicles with a d-c machine and an armature current control element.

Such a propulsion system is known from German Published, Non-Prosecuted Application DE-OS No. 31 16 341. In the propulsion system described therein with a d-c control element for the armature and the field current, faulty operation can lead to commutator damages. Starting up without a clutch by means of the armature control element with the machine standing still, can induce the driver to hold the vehicle on inclines without a mechanical brake merely by pressing the "gas pedal". In this case, a large armature current flows through the machine at standstill, which leads to commutator damage. A similarly large, detrimental armature current is obtained if it is attempted to start in the wrong gear (too high) on slopes or curbs.

It is accordingly an object of the invention to provide a propulsion system for vehicles with a d-c machine which overcomes the hereinafore-mentioned disadvantage of the heretofore-known devices of this general type, with commutator protection which effectively prevents overheating of the commutator due to excessively large armature current with the machine standing still or rotating slowly.

With the foregoing and other objects in view there is provided, in accordance with the invention, a propulsion system for vehicles, comprising a d-c machine, an armature current control element connected to the d-c machine, an alternating member having an output side connected to the armature control element and having an input side, an armature current control device connected between the input side of the alternating member and the d-c machine for delivering a first armature current reference value to the alternating member, a maximum value former connected between the input side of the alternating member and the d-c machine for receiving the value of the actual machine speed and the actual armature current from the d-c machine and for delivering a second maximally permissible armature current reference value to the alternating member, the alternating member passing on the smaller of the first and second armature current reference values to the armature current control element.

The advantages obtainable with the invention are in particular that the commutator protection is of simple construction and can be manufactured inexpensively. The normal operating behavior of the vehicle is not influenced by the commutator protection; the commutator protection responds only if the driver makes a mistake.

In accordance with another feature of the invention, the alternating member is a minimum selector.

In accordance with a further feature of the invention, the alternating member is a switch having a first input connected to the armature current control device, a second input receiving zero potential and an output connected to the armature current control element, and including a Schmitt trigger connected between the maximum value former and the switch, for addressing the switch. In accordance with a concomitant feature of the invention, there is provided a PT1 time delay member connected between the maximum value former and the d-c machine.

Other features which are considered as characteristic for the invention are set forther in the appended claims.

Although the invention is illustrated and described herein as embodied in a propulsion system for vehicles with a d-c machine, it is nevertheless not intended to be limited to the details shown, since various modifications and structural changes may be made therein without departing from the spirit of the invention and within the scope and range of equivalents of the claims.

Figure 2:
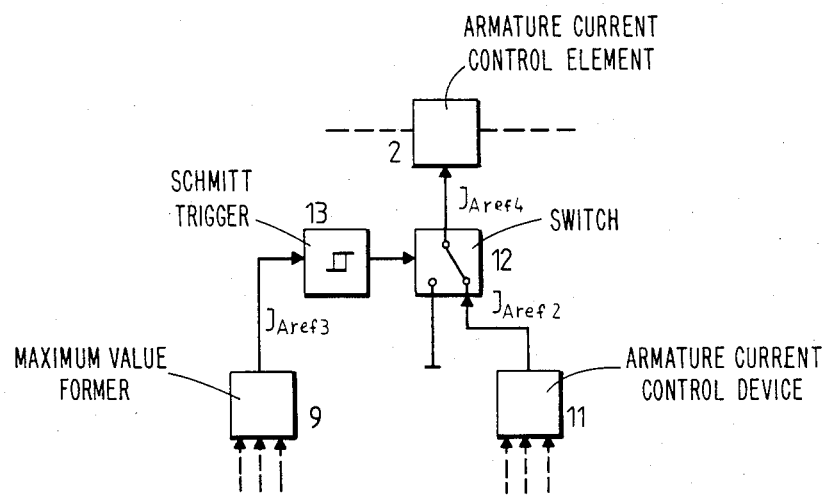

The construction and method of operation of the invention, however, together with additional objects and advantages thereof will be best understood from the following description of specific embodiments when read in connection with the accompanying drawings, in which:

FIG. 1 is a block diagram of the propulsion system according to the invention with commutator protection; and FIG. 2 is a block diagram of a variant of the commutator protection device of FIG. 1.

Referring now to the figures of the drawing in detail, and first particularly to FIG. 1 thereof, there is seen a block diagram of the propulsion system according to the invention with commutator protection, for a streetcar with an electric storage battery that is propelled by a separately excited d-c machine 1. In order to provide for setting the armature current, an armature current control element 2 is provided in the armature circuit of the machine 1. More specifically, the first armature terminal of the machine 1 is connected through the armature current control element 2 to the first pole of a d-c voltage source 3, while the second armature terminal is connected directly to the second pole of the d-c voltage source 3. The machine 1 has a separately excited field winding 4, the field current being set by means of a field current control element 5 which is connected in series with the winding 4. The first terminal of the field winding 4 is connected through the field current control element 5 to the first pole of the d-c voltage source 3, while the second terminal is connected directly to the second pole.

For measuring the actual armature current value $J_{Aact}$, a current pickup device 6 is connected in series with the first armature terminal. For measuring the actual value of the speed of rotation of the machine $n_{Mact}$, the d-c machine is equipped with a speed pickup device 7.

The actual armature current value $J_{Aact}$ is conducted with a delay to a maximum value former 9 through a time delay member 8, preferably a PT1-member. A reference voltage E and the actual value of the machine speed $n_{Mact}$ are fed to the maximum value former 9 as further input variables. By means of these three input variables, the maximum value former 9 forms a maximally permissible armature current reference value $J_{Aref3}$ as a function of the machine speed, which is harmless for the commutator of the machine 1, and delivers this value to a first input of a minimum selector 10.

There is further provided an armature current control device 11 having on the input side which receives the (undelayed) actual armature current value $J_{Aact}$, the actual machine speed value $n_{Mact}$, and an armature reference value $J_{Aref1}$ preset by the "gas pedal" or speed control of the electric vehicle. By means of these three inputs, the armature current control device 11 forms a desired armature-current reference value $J_{Aref2}$ and delivers this value to a second input of the minimum selector 10.

The minimum selector 10 passes the smaller of the two armature current reference values $J_{Aref2}$ and $J_{Aref3}$ to the armature current control element 2 as the value $J_{Aref4}$, i.e. a comparison is being made as to whether or not the reference value $I_{Aref2}$, demanded by the armature current control device 11, is permissible.

In normal operation of the electric vehicle, the armature current reference value $J_{Aref2}$ demanded by the armature current control device 11 is always smaller than the highest permissible armature current reference value $J_{Aref3}$ formed by the maximum value former 9, i.e. the minimum selector 10 always delivers the value $J_{Aref2}$ to the armature current control element 2. If the driver makes a mistake (such as holding the vehicle on slopes without a mechanical brake or selecting too high a gear on slopes or curbs, etc.), however, the value $J_{Aref2}$ increases heavily because of the armature current reference value $J_{Aref1}$ which is predetermined by the "gas pedal" and is too large for the machine speed. However, this detrimental large armature current reference value $J_{Aref2}$ is only passed-on by the minimum selector 10 during a time period which depends on the timing member 8. After the end of this defined delay time of the timing member 8, the value $J_{Aref3}$ is smaller than the value $J_{Aref2}$ in this harmful operating condition, i.e. the maximally permissible armature current reference value $J_{Aref3}$ which is not harmful to the commutator of the machine 1, is passed-on by the minimum selector 10. Consequently, the armature current is regulated down to a harmless value.

The defined delay time of the timing member 8 is set in such a way that starting the vehicle in the highest gear (smallest starting torque) on a level span is still just possible with a small current.

In FIG. 2, a variant of the apparatus according to FIG. 1 is shown, in which a switch is employed in lieu of the minimum selector. The input signals $J_{Aact}$, $n_{Mact}$ as well as $J_{Aref1}$ are likewise fuel to the armature current control device 11. On the output side, however, the control device 11 delivers the value $J_{Aref2}$ to the first input of a switch 12; a minimum selector 10 is therefore not provided in this variant. The second input of the switch 12 is connected to zero potential, while the output of the switch 12 is connected to the armature current control element 2.

The input signals $n_{Mact}$, E and the delayed value of $J_{Aact}$ are likewise fed to the maximum value former 9. On the output side, however, the maximum value former 9 delivers the value $I_{Aref3}$ to a Schmitt trigger 13. The Schmitt trigger 13 controls the output side of the switch 12. If the value $J_{Aref3}$ fed to the Schmitt trigger 13 falls below a minimum adjustable trigger level (for instance, zero), the switch 12 switches to its second input, i.e. the value zero, as the value $I_{Aref4}$ to be fed to the armature current control element 2. If the valve $I_{Aref3}$ fed to the Schmitt trigger exceeds the adjustable minimum trigger level, then the switch 12 switches to its first input, i.e. the value $I_{Aref2}$ is the value $I_{Aref4}$ to be fed to the armature current control element 2.

The method of using the device described, can be applied in the same manner to propulsion systems with d-c machines, in which the armature and the field are connected in series.

We claim:

1. Propulsion system for vehicles, comprising a d-c machine, an armature current control element connected to said d-c machine, an alternating member having an output side connected to said armature control element and having an input side, an armature current control device connected between said input side of said alternating member and said d-c machine for delivering a first armature current reference value to said alternating member, a maximum value former connected between said input side of said alternating member and said d-c machine for receiving the value of the actual machine speed and the actual armature current from said d-c machine and for delivering a second maximally permissible armature current reference value to said alternating member, said alternating member passing on the smaller of said first and second armature current reference values to said armature current control element.

2. Propulsion system according to claim 1, wherein said alternating member is a minimum selector.

3. Propulsion system according to claim 1, wherein said alternating member is a switch having a first input connected to said armature current control device, a second input receiving zero potential and an output connected to said armature current control element, and including a Schmitt trigger connected between said maximum value former and said switch, for addressing said switch.

4. Propulsion system according to claim 1, including a PT1 time delay member connected between said maximum value former and said d-c machine.

5. Propulsion system according to claim 2, including a PT1 time delay member connected between said maximum value former and said d-c machine.

* * * * *